(12) United States Patent
Sugano et al.

(10) Patent No.: US 9,183,751 B2
(45) Date of Patent: Nov. 10, 2015

(54) TRAVEL CONTROL DEVICE AND TRAVEL CONTROL METHOD

(71) Applicant: NISSAN MOTOR CO., LTD., Kanagawa (JP)

(72) Inventors: Takeshi Sugano, Yokohama (JP); Toshimichi Gokan, Machida (JP); Masahiro Kobayashi, Novi, MI (US)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/378,042

(22) PCT Filed: Feb. 12, 2013

(86) PCT No.: PCT/JP2013/053199
§ 371 (c)(1),
(2) Date: Aug. 11, 2014

(87) PCT Pub. No.: WO2013/122030
PCT Pub. Date: Aug. 22, 2013

(65) Prior Publication Data
US 2015/0035663 A1    Feb. 5, 2015

(30) Foreign Application Priority Data

Feb. 14, 2012    (JP) .................................. 2012-029722

(51) Int. Cl.
| | | |
|---|---|---|
| *G08G 9/02* | (2006.01) | |
| *G01S 13/93* | (2006.01) | |
| *G08G 1/16* | (2006.01) | |
| *G01S 15/93* | (2006.01) | |
| *G01S 13/86* | (2006.01) | |
| *B60Q 9/00* | (2006.01) | |
| *G01S 15/87* | (2006.01) | |
| *G01S 13/87* | (2006.01) | |

(52) U.S. Cl.
CPC *G08G 9/02* (2013.01); *B60Q 9/008* (2013.01); *G01S 13/862* (2013.01); *G01S 13/931* (2013.01); *G01S 15/876* (2013.01); *G01S 15/931* (2013.01); *G08G 1/166* (2013.01); *G01S 13/87* (2013.01); *G01S 2013/9317* (2013.01); *G01S 2013/9332* (2013.01); *G01S 2013/9353* (2013.01); *G01S 2013/9357* (2013.01); *G01S 2013/9375* (2013.01); *G01S 2013/9378* (2013.01); *G01S 2013/9385* (2013.01); *G01S 2015/932* (2013.01); *G01S 2015/938* (2013.01)

(58) Field of Classification Search
CPC combination set(s) only.
See application file for complete search history.

(56) References Cited

FOREIGN PATENT DOCUMENTS

JP    2009-280109 A    12/2009

*Primary Examiner* — Brian Zimmerman
*Assistant Examiner* — Cal Eustaquio
(74) *Attorney, Agent, or Firm* — Young Basile

(57) ABSTRACT

A travel control device includes rear obstacle detection sensors; side obstacle detection sensors; a warning unit providing warning about an obstacle detected by the sensors; and a control unit controlling the warning unit so that the warning is provided if a distance to an obstacle detected by the rear obstacle detection sensors is equal to or less than a first risk, or if a parameter based on a distance to the obstacle detected by the sensors is equal to or less than a second risk. If the parameter based on the distance to the obstacle detected by the sensors is greater than the second risk, the control unit increases a first warning threshold until a hold time elapses after the sensors become unable to detect the obstacle.

8 Claims, 7 Drawing Sheets

TRAVEL CONTROL DEVICE AND TRAVEL CONTROL METHOD

CROSS REFERENCE TO RELATED APPLICATION

The present application claims priority to Japanese Patent Application No. 2012-029722, filed Feb. 14, 2012 and incorporated herein in its entirety.

TECHNICAL FIELD

The present invention relates to a travel control device and a travel control method.

BACKGROUND

A technique for a vehicle to detect an obstacle approaching the surroundings of the vehicle by using an obstacle sensor mounted on the vehicle has heretofore been known.

For example, in Japanese Patent Application Publication No. 2009-280109, a rear portion of the vehicle is mounted with an ultrasonic sensor having a detection region rearward of the vehicle, and an ultrasonic sensor having a detection region laterally rearward of the vehicle. The ultrasonic sensor having the detection region laterally rearward of the vehicle has a detectable region in which an obstacle located even far away in the rear is detectable, whereas the ultrasonic sensor having the detection region rearward of the vehicle can detect the obstacle only in the vicinity of the vehicle. Therefore, an undetectable region in which any obstacle is undetectable is present far away right behind the vehicle.

SUMMARY

Even if an obstacle is detected, the ultrasonic sensor having the detection region laterally rearward of the vehicle does not issue a warning unless a distance to the obstacle or approach time is less than a warning threshold. When the obstacle moves from there to the undetectable region rearward of the vehicle, neither of the ultrasonic sensors can detect the obstacle until the ultrasonic sensor having the detection region rearward of the vehicle detects the obstacle, and therefore, a delay in detection of the obstacle may occur.

The present invention has been made in view of the foregoing problem. An object of the present invention is to provide a travel control device and a travel control method which properly detect an obstacle even if the obstacle enters an undetectable region, thereby suppressing a delay in the timing of warning or unwarned conditions when a vehicle moves rearward.

A travel control device according to a first aspect of the present invention includes a rear obstacle detection unit, a side obstacle detection unit, a rearward movement preparation detection unit, a warning unit, and a control unit. The rear obstacle detection unit detects an obstacle entering an area rearward of a vehicle, and a distance to the obstacle. The side obstacle detection unit detects an obstacle entering a predetermined lateral side detection region including an area laterally rearward of the vehicle, and a distance to the obstacle. The rearward movement preparation detection unit detects the vehicle preparing to move rearward. The warning unit provides warning about the obstacle detected by the rear obstacle detection unit or the side obstacle detection unit. The control unit controls the warning unit so that the warning is provided if the distance to the obstacle detected by the rear obstacle detection unit is equal to or less than a first warning threshold, or if a parameter based on the distance to the obstacle detected by the side obstacle detection unit is equal to or less than a second warning threshold. If the rearward movement preparation detection unit detects the vehicle preparing to move rearward and the parameter based on the distance to the obstacle detected by the side obstacle detection unit is greater than the second warning threshold, the control unit increases the first warning threshold until a hold time elapses after the side obstacle detection unit becomes unable to detect the obstacle.

A travel control method according to a second aspect of the present invention using a travel control device including the rear obstacle detection unit, the side obstacle detection unit, the rearward movement preparation detection unit, and the warning unit includes controlling the warning unit so that the warning is provided if the distance to the obstacle detected by the rear obstacle detection unit is equal to or less than a first warning threshold, or if a parameter based on the distance to the obstacle detected by the side obstacle detection unit is equal to or less than a second warning threshold; and increasing the first warning threshold until a hold time elapses after the side obstacle detection unit becomes unable to detect the obstacle, if the rearward movement preparation detection unit detects the vehicle preparing to move rearward and the parameter based on the distance to the obstacle detected by the side obstacle detection unit is greater than the second warning threshold.

DESCRIPTION OF EMBODIMENTS

Figure 1:
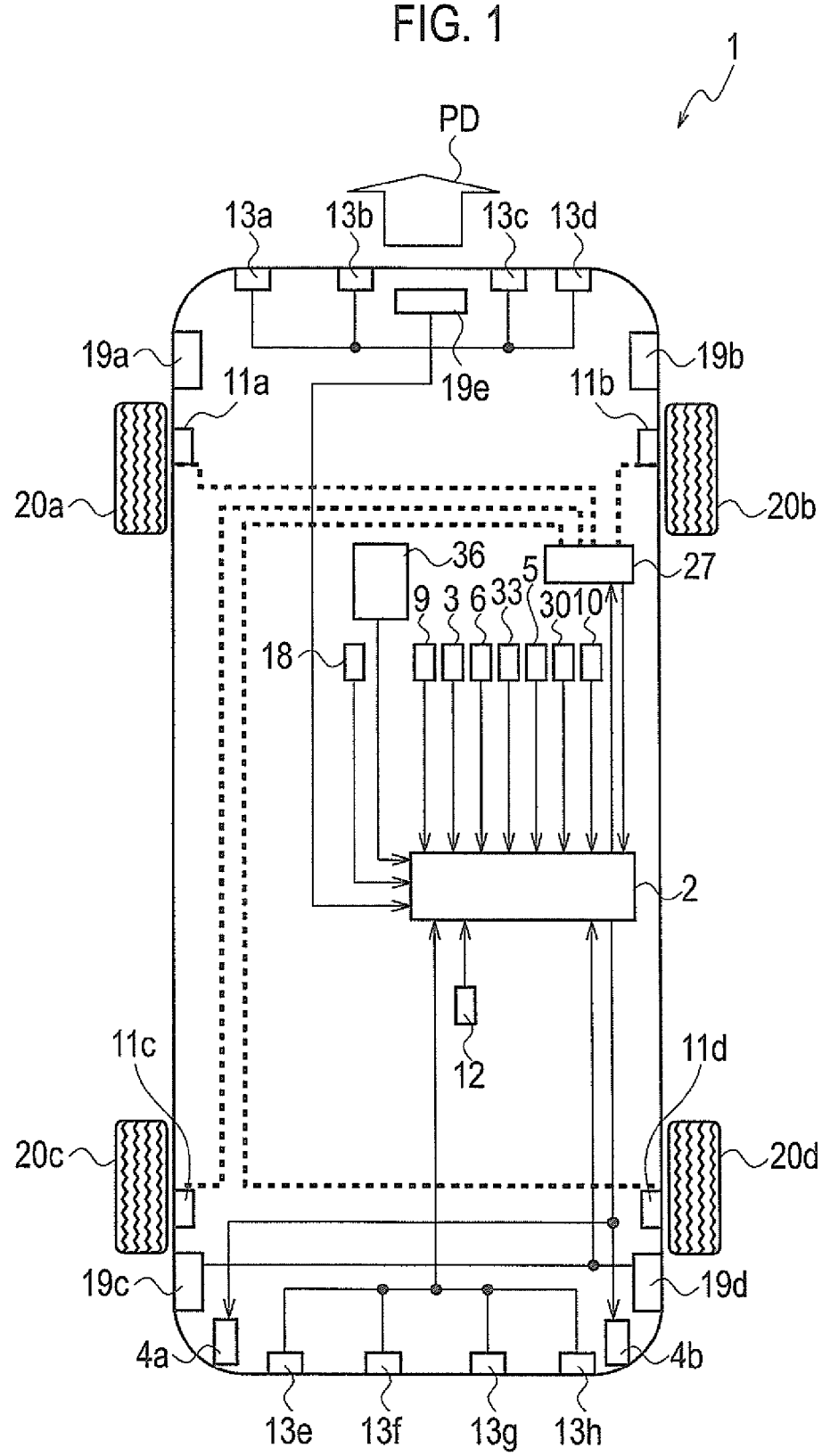
FIG. 1 is a schematic view illustrating an example of a vehicle layout of a travel control device according to an embodiment.

An embodiment of the present invention will be described below with reference to the drawings. In the disclosures of the drawings, the same portions are designated by the same reference characters.

[Travel Control Device]

Description will be given with reference to FIG. 1 with regard to an example of a vehicle layout of a travel control device according to an embodiment. A vehicle 1 is mounted with brake lamps 4a, 4b, an ignition switch 18 which provides commands to start and stop a driving force generation device including an engine and a motor, front obstacle detection sensors 13a to 13d, 19e which detect an obstacle approaching a front side PD of the vehicle 1, rear obstacle detection sensors 13e to 13h which detect an obstacle approaching a rear side of the vehicle 1, side obstacle detection sensors 19a to 19d which detect an obstacle approaching lateral sides of the vehicle 1, a driving force generation device 36 which generates a driving force for the vehicle, a braking force generation device 27, an accelerator pedal manipulation reaction force generation device 30, an alarm device 33 which alerts a driver that an obstacle is approaching, and a vehicle control device 2 (control unit) which controls the overall vehicle 1. Incidentally, the vehicle control device 2 corresponds to a control unit of the travel control device according to the embodiment.

The front obstacle detection sensors 13a to 13d are installed for example in a front bumper of the vehicle 1, and the rear obstacle detection sensors 13e to 13h are installed for example in a rear bumper of the vehicle 1. Sonar detectors which use ultrasonic waves to detect an obstacle entering a region relatively in the vicinity of the vehicle 1 and a distance to the obstacle can be used as the front obstacle detection sensors 13a to 13d and the rear obstacle detection sensors 13e to 13h. The side obstacle detection sensors 19a to 19d are arranged respectively one on each of left and right fenders of the vehicle 1 on the front side PD and the rear side, and the front obstacle detection sensor 19e is installed for example in the front bumper of the vehicle 1. Radar detectors which use electromagnetic waves to detect an obstacle entering a region relatively far away from the vehicle 1 can be used as the side obstacle detection sensors 19a to 19d and the front obstacle detection sensor 19e. Therefore, a distance to which the side obstacle detection sensors 19a to 19d and the front obstacle detection sensor 19e can detect the obstacle is longer than a distance to which the front obstacle detection sensors 13a to 13d and the rear obstacle detection sensors 13e to 13h can detect the obstacle. The vehicle control device 2 is configured by a processing unit such as an ECU (Engine Control Unit), and a CPU in the processing unit executes a previously stored computer program thereby to control operation of the overall vehicle 1.

A configuration of the travel control device according to the embodiment will be described with reference to FIG. 2. The travel control device according to the embodiment includes a vehicle information acquisition unit 21 which acquires information on the vehicle 1, a surrounding information acquisition unit 22 which acquires information on the surroundings of the vehicle, a system state selection unit 23, a control decision information calculation unit 24, and a warning device which issues a warning to an obstacle detected by the surrounding information acquisition unit 22. Here, the warning device includes a braking force generation system (25 to 27) which generates a braking force to give the warning of the approach of the obstacle, an accelerator pedal manipulation reaction force generation system (28 to 30) which generates an accelerator pedal manipulation reaction force to give the warning of the approach of the obstacle, an alarm system (31 to 33) which gives an alarm to the driver to give the warning of the approach of the obstacle, and a driving force generation system (34 to 36) which performs driving force control to give the warning of the approach of the obstacle.

Figure 3:
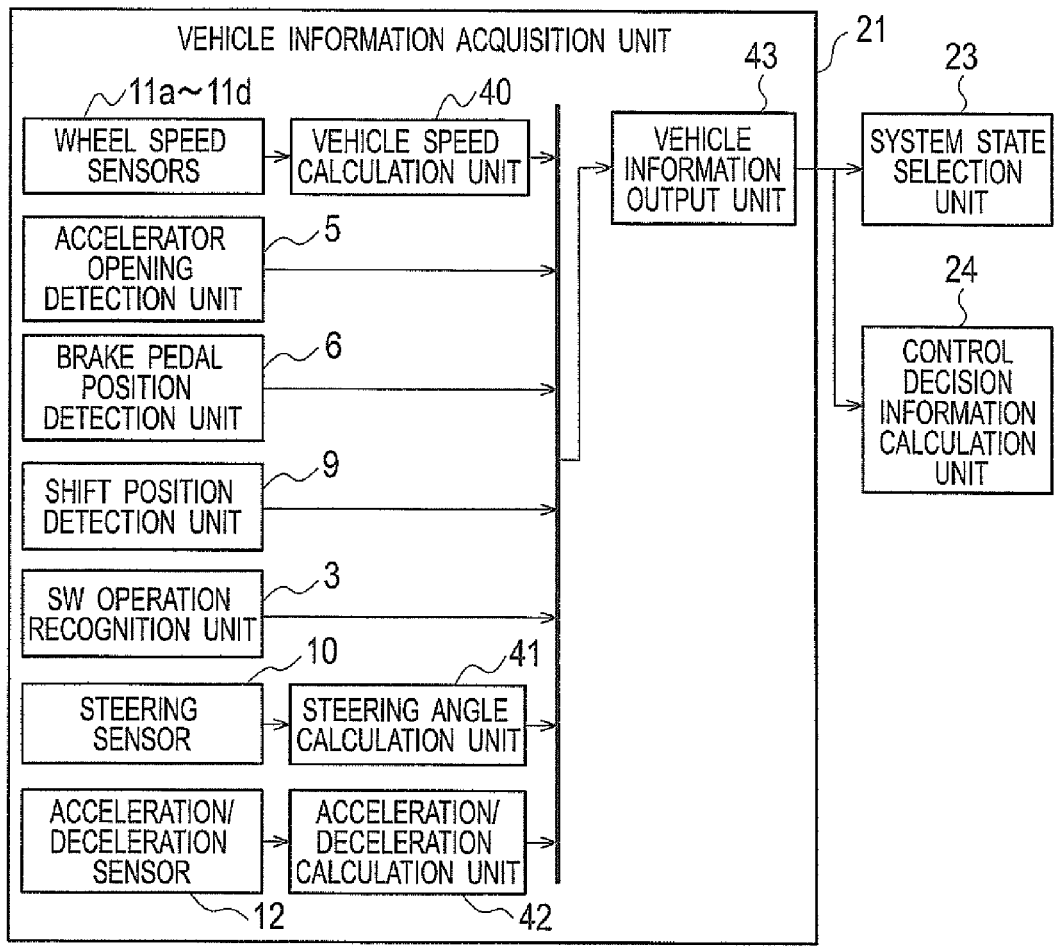
FIG. 3 is a block diagram illustrating a specific example of a configuration of a vehicle information acquisition unit 21 of FIG. 2.

As illustrated in FIG. 3, the vehicle information acquisition unit 21 includes wheel speed sensors 11a to 11d installed on wheels 20a to 20d, respectively, of the vehicle 1, an accelerator opening detection unit 5 installed on an accelerator pedal of the vehicle 1, a brake pedal position detection unit 6 which detects the position of a brake pedal of the vehicle 1, a shift position detection unit 9 (or a rearward movement preparation detection unit) which detects the shift position of the vehicle 1, an SW operation recognition unit 3 which detects the state of an on-off switch for the travel control device, a steering sensor 10 which detects a steering angle of a steering wheel of the vehicle 1, and an acceleration/deceleration sensor 12 which detects acceleration or deceleration of the vehicle 1.

The wheel speed sensors 11a to 11d detect rotation speeds of the wheels 20a to 20d, respectively, of the vehicle 1. A vehicle speed calculation unit 40 calculates a vehicle speed (or a wheel speed) from the rotation speeds of the wheels 20a to 20d, taking into account a radius of rotation of the wheels 20a to 20d. Further, the vehicle speed calculation unit 40 calculates a travel distance by integrating the vehicle speed. The brake pedal position detection unit 6 detects whether or not the driver is depressing the brake pedal, and detects the amount of depression of the brake pedal. The shift position detection unit 9 detects the state of the shift position in order to detect the present state of a transmission. An example of detection of the vehicle 1 preparing to move rearward includes detection of a rearward movement (R) position by the shift position detection unit 9. The SW operation recognition unit 3 detects the switch state of the travel control device and the switch state of the ignition switch 18. A steering angle calculation unit 41 performs filtering processing on the steering angle of the steering wheel detected by the steering sensor 10, as needed. An acceleration/deceleration calculation unit 42 performs filtering processing on the acceleration or deceleration of the vehicle 1 detected by the acceleration/deceleration sensor 12, as needed. A vehicle information output unit 43 transfers the wheel speed of the vehicle 1, an accelerator opening, the position of the brake pedal, the shift position, the state of the on-off switch for the travel control device, the steering angle of the steering wheel and the acceleration or deceleration, as vehicle information, to the system state selection unit 23 or the control decision information calculation unit 24. The vehicle speed calculation unit 40, the steering angle calculation unit 41, the acceleration/deceleration calculation unit 42 and the vehicle information output unit 43 can be configured as a portion of the vehicle control device 2 of FIG. 1. Of course, a processing unit which is different from the vehicle control device 2 is prepared, and a CPU in the processing unit executes a previously stored computer program. This may implement operation of the vehicle speed calculation unit 40, the steering angle calculation unit 41, the acceleration/deceleration calculation unit 42 and the vehicle information output unit 43.

Figure 4:
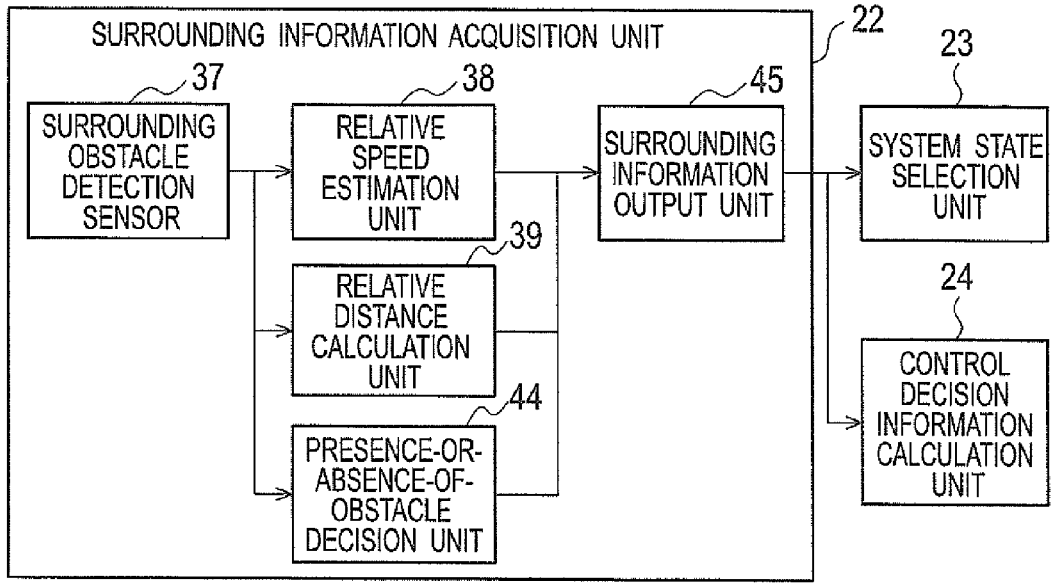
FIG. 4 is a block diagram illustrating a specific example of a configuration of a surrounding information acquisition unit 22 of FIG. 2.

A detailed example of a configuration of the surrounding information acquisition unit 22 will be described with reference to FIG. 4. The surrounding information acquisition unit 22 includes the front obstacle detection sensors 13a to 13d, 19e, the rear obstacle detection sensors 13e to 13h, and the side obstacle detection sensors 19a to 19d, which are installed on the front, rear and lateral sides of the vehicle 1 illustrated in FIG. 1 so as to be configured as a surrounding obstacle detection sensor 37. A relative distance calculation unit 39 performs filtering processing on a value of a distance from an obstacle detected by the surrounding obstacle detection sensor 37, as needed. A relative speed estimation unit 38 estimates a relative speed with respect to the obstacle from the distance to the obstacle. The sign of the relative speed is such that a positive sign indicates a direction in which the obstacle approaches the vehicle 1 and a negative sign indicates a direction in which the obstacle moves away from the vehicle 1. Further, the relative speed estimation unit 38 calculates the time (or approach time) required for the obstacle to approach the vehicle 1 from the distance to the obstacle and the relative speed detected by the side obstacle detection sensors 19a to 19d. The approach time may be determined for example by obtaining TTC (Time-To-Collision) by dividing the distance to the obstacle by the relative speed. A presence-or-absence-of-obstacle decision unit 44 outputs a signal indicating whether or not the surrounding obstacle detection sensor 37 has detected the obstacle. A surrounding information output unit 45 transfers the presence or absence of a possible obstacle which may be present at the front side PD, the rear side and the lateral sides of the vehicle 1, the distance to the obstacle and the relative speed, and the approach time and a direction or angle of detection of the obstacle to be described later, as surrounding information, to the system state selection unit 23 or the control decision information calculation unit 24. The relative distance calculation unit 39, the relative speed estimation unit 38, the presence-or-absence-of-obstacle decision unit 44 and the surrounding information output unit 45 can be configured as a portion of the vehicle control device 2 of FIG. 1. Of course, a processing unit which is different from the vehicle control device 2 is prepared, and a CPU in the processing unit executes a previously stored computer program. This may implement operation of the relative distance calculation unit 39, the relative speed estimation unit 38, the presence-or-absence-of-obstacle decision unit 44 and the surrounding information output unit 45.

The system state selection unit 23 determines whether to set the system state to the on or off state, based on the state of the on-off switch for the travel control device detected by the SW operation recognition unit 3.

Figure 9:
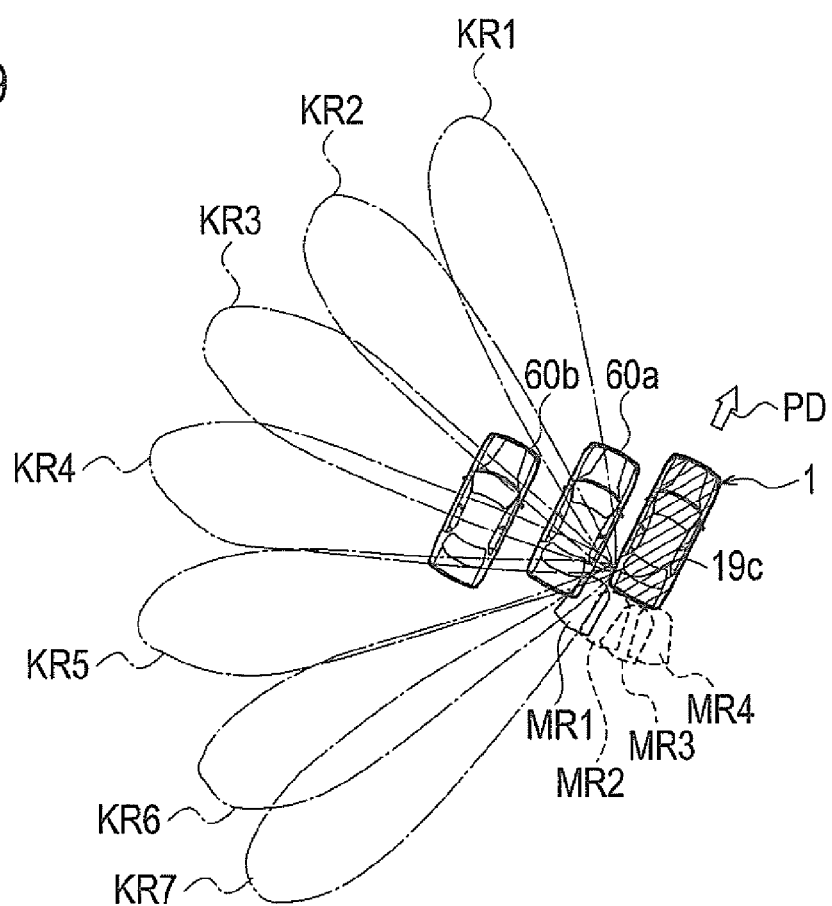
FIG. 9 is a plan view illustrating a lateral side detection region in which a side obstacle detection sensor 19c can detect the obstacle, and rear detection areas MR1 to MR4 in which rear obstacle detection sensors 13e to 13h can detect the obstacle, respectively.

Description will be given with reference to FIG. 9 with regard to a lateral side detection region, taking the side obstacle detection sensor 19c as an example. The side obstacle detection sensor 19c installed on a rear fender of the vehicle 1 on the left side thereof toward the rear thereof can detect a vehicle 60a, 60b entering a sector-shaped region (or the lateral side detection region) with a predetermined angle, including the lateral side of the vehicle 1, and ranging from the lateral side to the rear side of the vehicle 1, centered about the side obstacle detection sensor 19c. The side obstacle detection sensor 19c may divide the lateral side detection region into plural detection angle areas KR1 to KR7, and detect, for each of the plural detection angle areas KR1 to KR7, an obstacle entering the detection angle area and a distance to the obstacle. Which of the detection angle areas KR1 to KR7 the obstacle is detected in can be determined for example by horizontally scanning electromagnetic waves in the lateral side detection region. The number of areas divided is not limited to seven but may be set less or more than seven. However, the side obstacle detection sensor 19c is not so limited but does not necessarily have to divide the lateral side detection region into the plural detection angle areas KR1 to KR7. In this case, the angle or direction of detection of the detected obstacle is not detected. Incidentally, the other side obstacle detection sensors 19a, 19b, 19d are the same as the side obstacle detection sensor 19c. Here, the laterals or sides of the vehicle refers to sides in a direction perpendicular to the parking direction PD of the vehicle 1, and FIG. 9 illustrates a left side as the lateral side. The rear of the vehicle refers to a side in a direction rotated 180° with respect to the parking direction PD of the vehicle 1. The boundary of the plural detection angle areas KR1 to KR7 on the rear side is located on the lateral side of a half-line extending rearward from the side obstacle detection sensor 19c.

The rear obstacle detection sensors 13e to 13h can detect the obstacle entering rear detection areas MR1 to MR4, respectively, extending rearward from the rear bumper of the vehicle 1. The rear obstacle detection sensors 13e to 13h are in a one-to-one correspondence with the rear detection areas MR1 to MR4. The adjacent rear detection areas MR1 to MR4 partially overlap one another. Also, some of the rear detection areas MR1 to MR4, on the left lateral side, overlap a portion of the lateral side detection region of the side obstacle detection sensor 19c. Also on the right lateral side, some of the rear detection areas MR1 to MR4 overlap a portion of the lateral side detection region of the side obstacle detection sensor 19d, although not illustrated.

Figure 5:
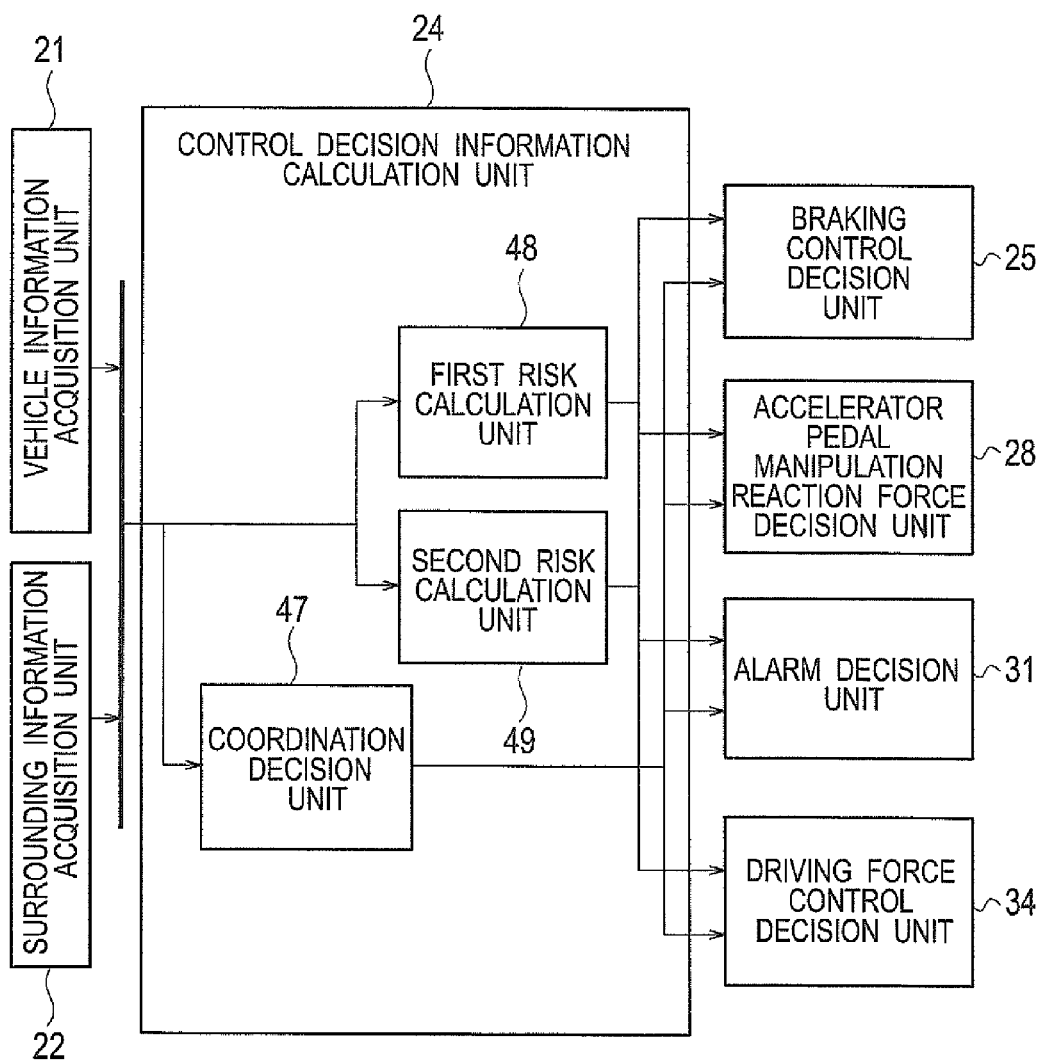
FIG. 5 is a block diagram illustrating a specific example of a configuration of a control decision information calculation unit 24 of FIG. 2.

A specific example of a configuration of the control decision information calculation unit 24 of FIG. 2 will be described with reference to FIG. 5. The control decision information calculation unit 24 includes a coordination decision unit 47 which determines whether or not to coordinate results detected by the side obstacle detection sensors 19a to 19d with results detected by the rear obstacle detection sensors 13e to 13h, a first risk calculation unit 48 which calculates a first risk (or a first warning threshold) as a criterion of judgment of warning, and a second risk calculation unit 49 which calculates a second risk (or a second warning threshold) as a criterion of judgment of warning. A result determined by the coordination decision unit 47 and results calculated by the first risk calculation unit 48 and the second risk calculation unit 49 are transmitted to a braking control decision unit 25, an accelerator pedal manipulation reaction force decision unit 28, an alarm decision unit 31, and a driving force control decision unit 34.

Figure 7:
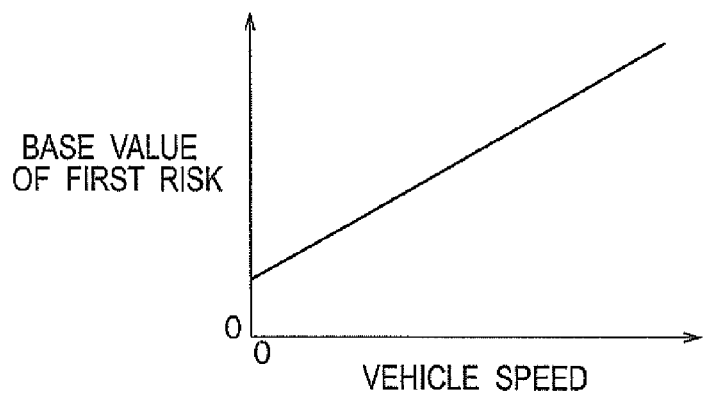
FIG. 7 is a graph showing an example of a relationship between a vehicle speed and a first risk (or a first warning threshold).

The first risk calculation unit 48 first calculates a base value of the first risk. The base value of the first risk is used as a reference value to determine whether or not to provide warning based on a distance to an obstacle detected by the rear obstacle detection sensors 13e to 13h. The base value of the first risk is a distance which varies according to the vehicle speed. For example, as illustrated in FIG. 7, the higher vehicle speed leads to the larger base value of the first risk. When the vehicle speed is equal to zero, the base value of the first risk may be offset to take on a predetermined value. Also, the base value of the first risk may be changed according to the approach time calculated by the relative speed estimation unit 38. Therefore, for example, the first risk calculation unit 48 may calculate the base value of the first risk from the vehicle speed and the approach time by referring to data indicating a relationship between the vehicle speed and the base value of the first risk illustrated in FIG. 7, and data indicating a relationship between the approach time and the base value of the first risk.

Then, the first risk calculation unit 48 calculates the first risk for each warning control from the base value of the first risk by using a coefficient for each warning control. For example, the first risk for each warning control can be calculated by varying weights for each warning control by multiplying the base value by a coefficient $R1\_K1$ for braking control, multiplying the base value by a coefficient $R1\_K2$ for accelerator pedal manipulation reaction force control, multiplying the base value by a coefficient $R1\_K3$ for alarm control, and multiplying the base value by a coefficient $R1\_K4$ for driving force control. For example, the coefficients are set to values which lie between 0 and 1 inclusive, and are such that the following relationship is established: $R1\_K1 \leq R1\_K2 \leq R1\_K4 \leq R1\_K3$. This enables weighting such that the alarm, the driving force control, the accelerator pedal manipulation reaction force control, and the braking control are performed in this order.

The second risk calculation unit 49 first calculates a base value of the second risk. The base value of the second risk includes a base value of the second risk (the distance) and a base value of the second risk (the approach time). The base value of the second risk (the distance) is used as a reference value to determine whether or not to provide warning based on a distance to an obstacle detected by the side obstacle detection sensors 19a to 19d. The base value of the second risk (the approach time) is used as a reference value to determine whether or not to provide warning based on the approach time calculated by the relative speed estimation unit 38. The base value of the second risk (the distance) varies according to the vehicle speed. Specifically, in the same manner as the first risk (the distance), the higher vehicle speed leads to the larger base value of the second risk (the distance). For example, the second risk calculation unit 49 can calculate the base value of the second risk (the distance) from the vehicle speed by referring to data indicating a relationship between the vehicle speed and the base value of the second risk (the distance). Also, the base value of the second risk (the distance) may be set to a different value from the base value of the first risk. In this case, it is desirable that the base value of the second risk (the distance) be set to a larger value than the base value of the first risk. When the vehicle speed is equal to zero, the base value of the second risk (the distance) may be offset to take on a predetermined value. Also, the base value of the second risk (the distance) may be changed according to the approach time calculated by the relative speed estimation unit 38.

Then, the second risk calculation unit 49 calculates the second risk (the distance) and the second risk (the approach time) for each warning control from the base value of the second risk (the distance) and the base value of the second risk (the approach time) by using a coefficient for each warning control. For example, the second risk (the distance) and the second risk (the approach time) for each control are calculated by varying weights for each control by multiplying the base value by a coefficient R2_K1 for braking control, multiplying the base value by a coefficient R2_K2 for accelerator pedal manipulation reaction force control, multiplying the base value by a coefficient R2_K3 for alarm control, and multiplying the base value by a coefficient R2_K4 for driving force control. For example, the coefficients are set to values which lie between 0 and 1 inclusive, and are such that the following relationship is established: R2_K1≤R2_K2≤R2_K4≤R2_K3. This enables weighting such that the alarm, the driving force control, the accelerator pedal manipulation reaction force control, and the braking control are performed in this order.

The coordination decision unit 47 determines whether or not to coordinate the side obstacle detection sensors 19a to 19c with the rear obstacle detection sensors 13e to 13h, and, if a decision is made to coordinate, the coordination decision unit 47 makes a correction on the first risk. Specifically, if the shift position detection unit 9 determines that the shift position of the vehicle 1 is located in the R (rearward movement) position and a parameter based on the distance to the obstacle detected by the side obstacle detection sensors 19a to 19c is greater than the second warning threshold, the coordination decision unit 47 increases the first risk (or the first warning threshold) until a hold time elapses after all the side obstacle detection sensors 19a to 19c become unable to detect the obstacle. Thereby, the rear obstacle detection sensors 13e to 13h can early detect the obstacle which is no longer detectable with the side obstacle detection sensors 19a to 19c. Here, the "parameter based on the distance to the obstacle" includes the distance to the obstacle detected by the side obstacle detection sensors 19a to 19c, and the approach time calculated by the relative speed estimation unit 38. When the distance to the obstacle is used as the parameter, the second risk (the distance) is used as the "second warning threshold," while when the approach time is used as the parameter, the second risk (the approach time) is used as the "second warning threshold."

Returning to FIG. 2, the braking force generation system (25 to 27) includes the braking control decision unit 25 which determines whether or not to perform braking force control to give a warning of the approach of an obstacle, a braking control unit 26, and the braking force generation device 27 which performs the braking force control to give the warning of the approach of the obstacle under control by the braking control unit 26. The accelerator pedal manipulation reaction force generation system (28 to 30) includes the accelerator pedal manipulation reaction force decision unit 28 which determines whether or not to perform accelerator pedal manipulation reaction force control to give the warning of the approach of the obstacle, an accelerator pedal manipulation reaction force control unit 29, and the accelerator pedal manipulation reaction force generation device 30 which performs the accelerator pedal manipulation reaction force control to give the warning of the approach of the obstacle under control by the accelerator pedal manipulation reaction force control unit 29. The alarm system (31 to 33) includes the alarm decision unit 31 which determines whether or not to give an alarm to the driver to give the warning of the approach of the obstacle, an alarm control unit 32, and the alarm device 33 which gives the alarm to the driver to give the warning of the approach of the obstacle under control by the alarm control unit 32. The driving force generation system (34 to 36) includes the driving force control decision unit 34 which determines whether or not to perform driving force control to give the warning of the approach of the obstacle, a driving force control unit 35, and the driving force generation device 36 which performs the driving force control to give the warning of the approach of the obstacle under control by the driving force control unit 35.

The first risk, the second risk (the distance) and the second risk (the approach time) calculated for each control are transmitted to the braking control decision unit 25, the accelerator pedal manipulation reaction force decision unit 28, the alarm decision unit 31, and the driving force control decision unit 34.

The braking control decision unit 25 determines to generate a braking force to give the warning of the approach of the obstacle, when any of conditions A01 to A03 described below is established. It is to be here noted that the distance to the obstacle detected by the rear obstacle detection sensors 13e to 13h is referred to as a "rear sensor detected distance," the distance to the obstacle detected by the side obstacle detection sensors 19a to 19d is referred to as a "side sensor detected distance," and the approach time calculated by the relative speed estimation unit 38 is referred to as "side sensor approach time." The first risk, the second risk (a distance value) and the second risk (the approach time) obtained by multiplying their base values by the coefficient R1_K1 or R2_K1 for the braking control are referred to as the first risk for braking, the second risk (the distance value) for braking and the second risk (the approach time) for braking, respectively.

A01: the first risk for braking>the rear sensor detected distance

A02: the second risk (the distance value) for braking>the side sensor detected distance A03: the second risk (the approach time) for braking>the side sensor approach time When the braking control decision unit 25 determines to activate warning by braking, the braking control unit 26 increases a brake pressure at a predetermined rate of change, and then, when a predetermined target brake pressure is reached, the braking control unit 26 maintains the brake pressure as it is. When hold time reaches a predetermined time (for example, 0.8 seconds), or when a predetermined time elapses after the vehicle speed has become equal to 0, the brake pressure is reduced to 0 at a predetermined rate of change. Incidentally, the predetermined rate of change and the predetermined target brake pressure may both be changed according to the vehicle speed or the distance to the obstacle. The braking force generation device 27 controls actual brake pressures on the wheels 20a to 20d so as to achieve the target brake pressure calculated by the braking control unit 26.

The accelerator pedal manipulation reaction force decision unit 28 determines to generate an accelerator pedal manipulation reaction force to give the warning of the approach of the obstacle, when any of conditions A04 to A06 described below is established. It is to be here noted that the first risk, the second risk (the distance value) and the second risk (the approach time) obtained by multiplying their base values by the coefficient $R1\_K2$ or $R2\_K2$ for the accelerator pedal manipulation reaction force are referred to as the first risk for APD, the second risk (the distance value) for APD and the second risk (the approach time) for APD, respectively.

A04: the first risk for APD>the rear sensor detected distance

A05: the second risk (the distance value) for APD>the side sensor detected distance A06: the second risk (the approach time) for APD>the side sensor approach time When the accelerator pedal manipulation reaction force decision unit 28 determines to generate the accelerator pedal manipulation reaction force, the accelerator pedal manipulation reaction force control unit 29 increases a reaction force command value at a predetermined rate of change, and then, when a predetermined reaction force command value is reached, the accelerator pedal manipulation reaction force control unit 29 maintains the reaction force command value as it is. When hold time reaches a predetermined time (for example, 0.8 seconds), the reaction force command value is reduced to 0 at a predetermined rate of change. Incidentally, the predetermined rate of change and the predetermined reaction force command value may both be changed according to the vehicle speed or the distance to the obstacle. The accelerator pedal manipulation reaction force generation device 30 controls the manipulation reaction force of the accelerator pedal so as to achieve the reaction force command value calculated by the accelerator pedal manipulation reaction force control unit 29.

The alarm decision unit 31 determines to give an alarm by a sound or a buzzer or the like to give the warning of the approach of the obstacle, when any of conditions A07 to A09 described below is established. It is to be here noted that the first risk, the second risk (the distance value) and the second risk (the approach time) obtained by multiplying their base values by the coefficient $R1\_K3$ or $R2\_K3$ for the alarm are referred to as the first risk for alarm, the second risk (the distance value) for alarm and the second risk (the approach time) for alarm, respectively.

A07: the first risk for alarm>the rear sensor detected distance

A08: the second risk (the distance value) for alarm>the side sensor detected distance A09: the second risk (the approach time) for alarm>the side sensor approach time When the alarm decision unit 31 determines to give the alarm, the alarm control unit 32 repeatedly turns on and off a buzzer driving signal for a predetermined time. The alarm device 33 gives the alarm based on the buzzer driving signal calculated by the alarm control unit 32. For example, a predetermined beep is repeatedly emitted. Alternatively, the alarm may be continuously sounded while any of the above-described conditions is satisfied. Further, simultaneously with the alarm, a light emitter such as an indicator installed in a meter may flash on and off.

The driving force control decision unit 34 determines to perform the driving force control to give the warning of the approach of the obstacle, when any of conditions A10 to A12 described below is established. It is to be here noted that the first risk, the second risk (the distance value) and the second risk (the approach time) obtained by multiplying their base values by the coefficient $R1\_K4$ or $R2\_K4$ for the driving force are referred to as the first risk for driving force, the second risk (the distance value) for driving force and the second risk (the approach time) for driving force, respectively.

A10: the first risk for driving force>the rear sensor detected distance

A11: the second risk (the distance value) for driving force>the side sensor detected distance A12: the second risk (the approach time) for driving force>the side sensor approach time When the driving force control decision unit 34 determines to perform the driving force control, the driving force control unit 35 increases the amount of reduction in the accelerator opening at a predetermined rate of change. When the amount of reduction in the accelerator opening reaches a predetermined value, the amount of reduction is maintained as it is. When the amount of reduction is maintained for a predetermined time, the amount of reduction in the accelerator opening is reduced to 0. The final throttle opening of the engine has a value obtained by subtracting the amount of reduction in the accelerator opening calculated by the driving force control unit 35 from the accelerator opening operated by the driver. Incidentally, the predetermined rate of change and the predetermined value of the amount of reduction in the accelerator opening may both be changed according to the vehicle speed or the distance to the obstacle. The driving force generation device 36 controls engine power based on the final throttle opening of the engine calculated by the driving force control unit 35.

In this manner, warning is determined based on the obstacle's approach time, and thereby, the warning of an obstacle can be provided when the obstacle is approaching the vehicle 1 at high speed even if there is a great distance to the obstacle detected by the rear obstacle detection sensors 13e to 13h or the side obstacle detection sensors 19a to 19d. This enables recognizing a potential danger of the obstacle, thus providing the properly timed warning.

Figure 2:
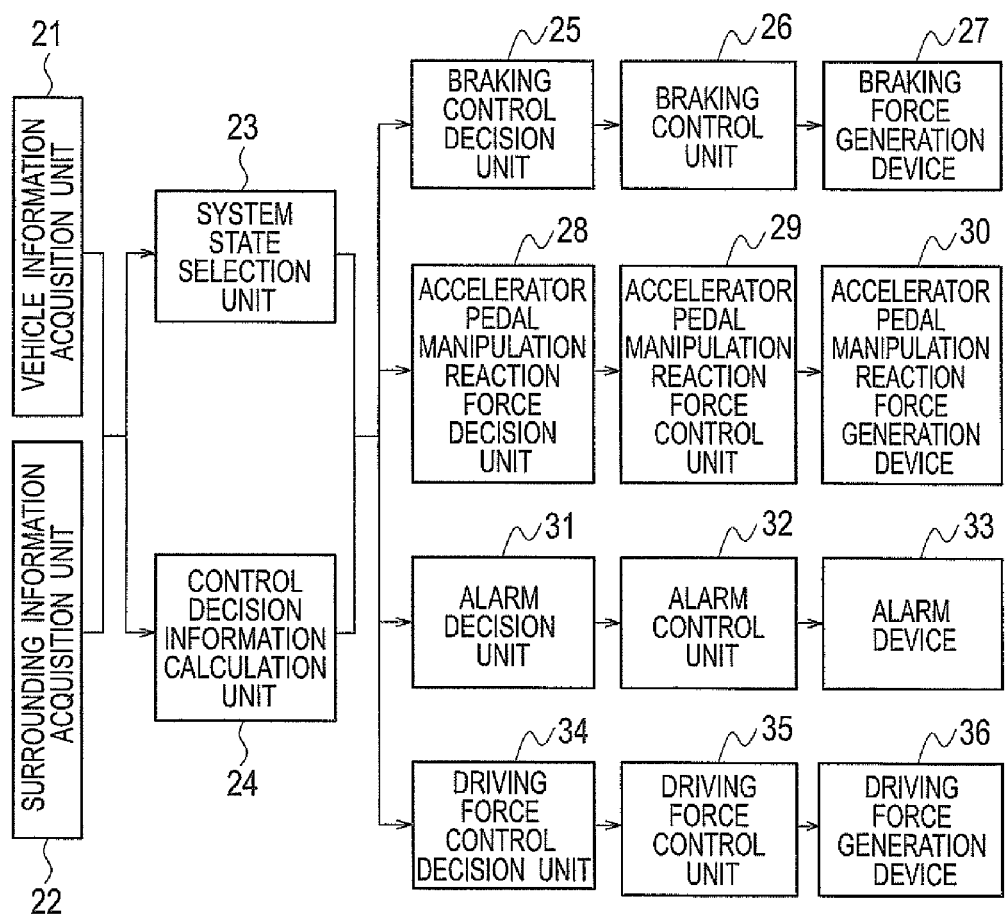
FIG. 2 is a block diagram illustrating a configuration of the travel control device according to the embodiment.

Incidentally, the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35, illustrated in FIG. 2 can be configured as a portion of the vehicle control device 2 of FIG. 1. Of course, a processing unit which is different from the vehicle control device 2 is prepared, and a CPU in the processing unit executes a previously stored computer program. This may implement operation of the system state selection unit 23, the control decision information calculation unit 24, the braking control decision unit 25, the braking control unit 26, the accelerator pedal manipulation reaction force decision unit 28, the accelerator pedal manipulation reaction force control unit 29, the alarm decision unit 31, the alarm control unit 32, the driving force control decision unit 34 and the driving force control unit 35.

[Travel Control Operation]

At the time of rearward movement of the vehicle 1, a control unit of the travel control device having the above-described configuration executes travel control operation described below, thereby enabling properly timed warning about an obstacle detected by the rear obstacle detection sensors 13e to 13h or the side obstacle detection sensors 19a to 19d. Description will be given below with reference to a flowchart of FIG. 6 with regard to how the travel control device operates when executing the travel control operation.

Figure 6:
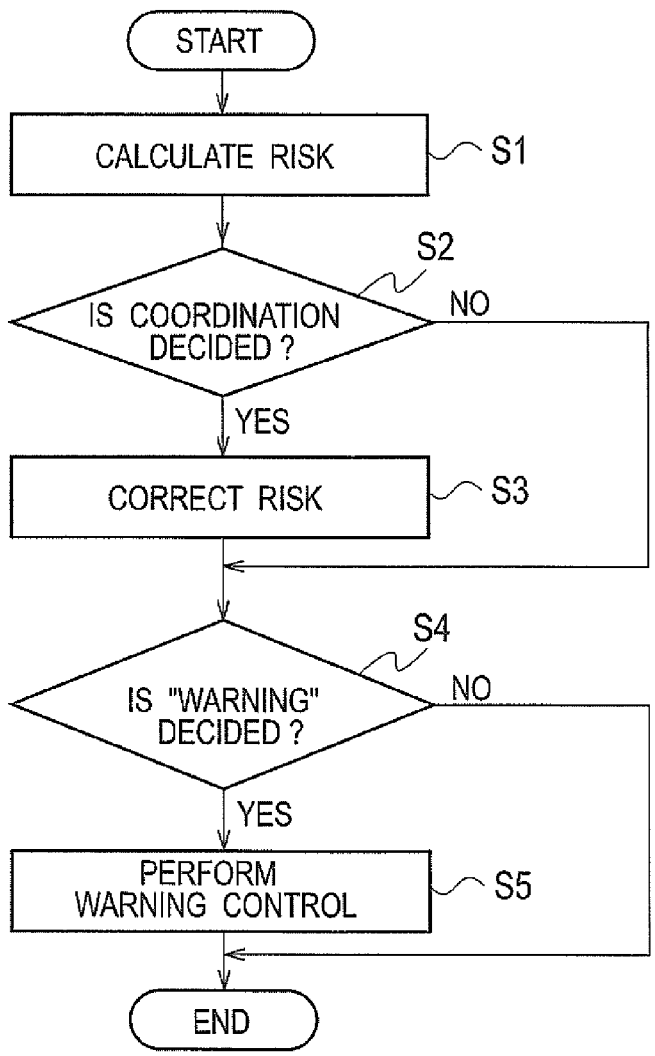
FIG. 6 is a flowchart illustrating how the travel control device operates when executing travel control operation.

The flowchart of FIG. 6 starts at the time when the system state selection unit 23 determines that the on-off switch for the travel control device is in the on state and the shift position detection unit 9 determines that the shift position of the vehicle 1 is located in the R (rearward movement) position, and the travel control operation goes to step S1 to perform processing. Then, the travel control operation is repeatedly executed so long as the on-off switch for the travel control device is in the on state and the shift position of the vehicle 1 is located in the R position. Also, the timing of start of the travel control operation is not limited to the above-described condition; besides the above-described condition, a condition such for example as where the vehicle speed is equal to or less than a predetermined value or the steering angle of the steering wheel is equal to or less than a predetermined value may be added.

In the processing of step S1, the first risk calculation unit 48 and the second risk calculation unit 49 determine the first risk or the second risk for each warning control. Specifically, the first risk for braking, the second risk (the distance value) for braking, the second risk (the approach time) for braking, the first risk for APD, the second risk (the distance value) for APD, the second risk (the approach time) for APD, the first risk for alarm, the second risk (the distance value) for alarm, the second risk (the approach time) for alarm, the first risk for driving force, the second risk (the distance value) for driving force, and the second risk (the approach time) for driving force are calculated.

In processing of steps S2 and S3, the coordination decision unit 47 determines whether or not to coordinate the side obstacle detection sensors 19a to 19c with the rear obstacle detection sensors 13e to 13h. If a decision is made to coordinate, the first risk calculated at step S1 is corrected to a large value so that the rear obstacle detection sensors 13e to 13h can early detect the obstacle which is no longer detectable with the side obstacle detection sensors 19a to 19c.

Figure 10:
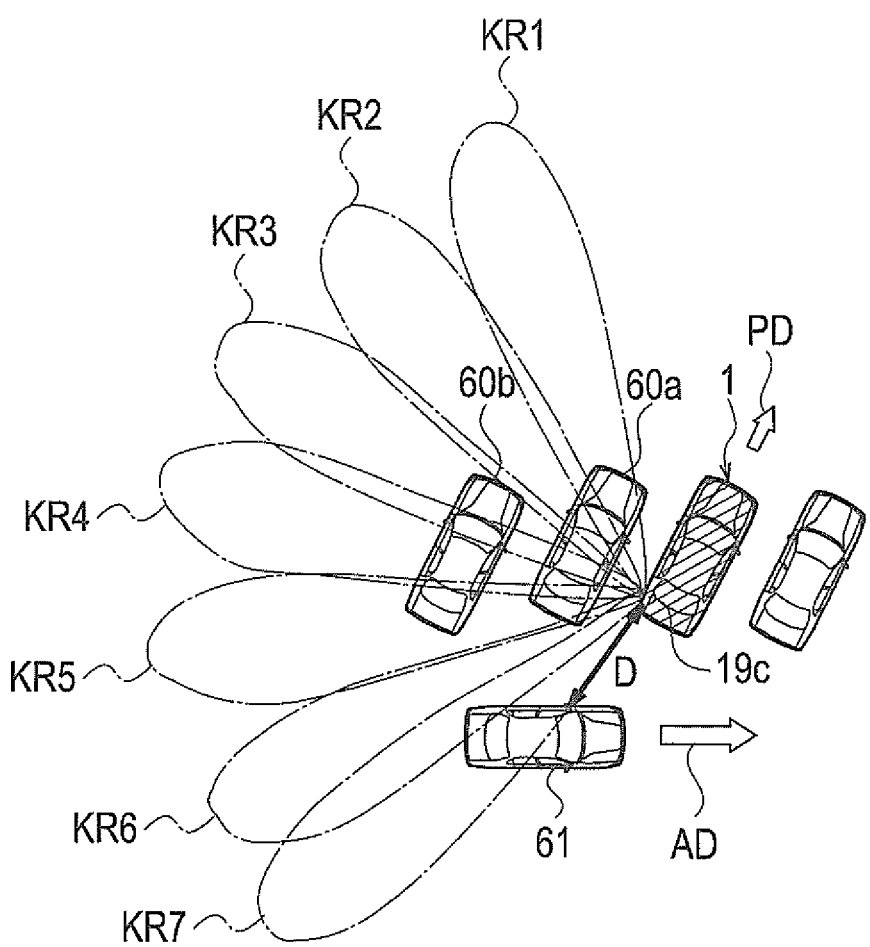
FIG. 10 is a plan view illustrating a vehicle 61 as running rearward in the vicinity of a vehicle 1, in a direction AD oblique relative to a parking direction PD of the vehicle 1.

Specifically, as illustrated in FIG. 10, a vehicle 61 (or an obstacle) running rearward of the vehicle 1 enters the lateral side detection region and is detected by the side obstacle detection sensor 19c. After that, the vehicle 61 goes out of the lateral side detection region, and thus the side obstacle detection sensor 19c becomes unable to detect the obstacle. Thus, if the temporarily detected obstacle goes out of the lateral side detection region and thus becomes undetected, or equivalently, the side obstacle detection sensor 19c loses track of the obstacle (YES at step S2), it is desirable that an early warning of the obstacle be then issued by using the results detected by the rear obstacle detection sensors 13e to 13h. Therefore, if the parameter (i.e. the distance or the approach time) based on the distance to the obstacle is greater than the second risk (i.e. the distance or the approach time), the coordination decision unit 47 corrects the first risk so as to increase the first risk until the hold time elapses after the side obstacle detection sensor 19c becomes unable to detect the obstacle (at step S3). Thereby, the rear obstacle detection sensors 13e to 13h can be coordinated for the obstacle lost by the side obstacle detection sensor 19c. This enables advancing the timing of warning based on the results detected by the rear obstacle detection sensors 13e to 13h, thus giving the early warning of the obstacle to the driver. After a lapse of the hold time, the corrected first risk is restored to its value before the correction. Meanwhile, if the obstacle is detected in the lateral side detection region (NO at step S2), the first risk calculated at step S1 is not corrected.

Incidentally, when the side obstacle detection sensor 19c becomes unable to detect the obstacle, it does not matter whether or not the rear obstacle detection sensors 13e to 13h detect the obstacle. In other words, at the instant when the side obstacle detection sensor 19c loses track of the obstacle, it does not matter whether or not the obstacle enters any of the rear detection areas MR1 to MR4 of the rear obstacle detection sensors 13e to 13h. If the distance to the obstacle is greater than the first risk at the instant when the side obstacle detection sensor 19c loses track of the obstacle, the timing of warning based on the results detected by the rear obstacle detection sensors 13e to 13h can be advanced by increasing the first risk.

In processing of step S4, the braking control decision unit 25, the accelerator pedal manipulation reaction force decision unit 28, the alarm decision unit 31, and the driving force control decision unit 34 determine whether or not to give a warning of the approach of the obstacle in accordance with the above-described conditions A01 to A12. Only when a decision is made to give the warning (YES at step S4), processing is performed at step S5 to give the warning of the approach of the obstacle.

Although description is here given taking the side obstacle detection sensor 19c as an example, any one or more of the side obstacle detection sensors 19a to 19d may replace the side obstacle detection sensor 19c for implementation.

Figure 8:
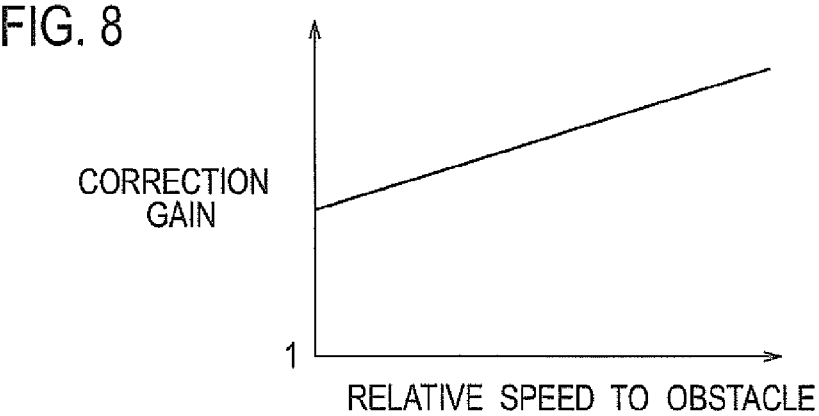
FIG. 8 is a graph showing an example of a relationship between a relative speed to an obstacle and a correction gain.

A first example of a method for correcting the first risk at step S3 is to multiply the base value of the first risk by a correction gain which is a number equal to or more than 1. The timing of warning can be uniformly advanced by correcting the first risk to a large value by multiplying the first risk by the number (for example, 2) equal to or more than 1, as the correction gain (or a fixed value). Also, the correction gain may be changed according to the relative speed to the obstacle at a time when all the side obstacle detection sensors 19a to 19d become unable to detect the obstacle. In this case, it is desirable that the correction gain be set larger as the relative speed to the obstacle becomes higher, as illustrated in FIG. 8. The higher relative speed to the obstacle can yield the earlier timing of warning, thus enabling proper warning control.

A second example of the method for correcting the first risk at step S3 is to set the base value of the first risk to a given value, for example 2 m, regardless of the vehicle speed illustrated in FIG. 7. Thereby, an early warning of the obstacle which is present rearward of the vehicle 1 can be issued with higher reliability. Incidentally, the base value of the first risk may be increased only for the rear obstacle detection sensors 13f, 13g in a central portion among the plural rear obstacle detection sensors 13e to 13h, according to the shape of the vehicle 1.

The hold time may be determined based on the distance (D) to the obstacle and the relative speed (VK) with respect to the obstacle at a time when the side obstacle detection sensor 19c becomes unable to detect the obstacle, as illustrated in FIG. 10. For example, the hold time (TK) can be calculated according to Equation (1). Here, "FST" indicates an offset value taking into account the overall width of the vehicle 1, and is set to 2.5 m, for example.

$$TK=(D+FST)/VK \qquad (1)$$

Alternatively, a shorter one of a preset time and the time determined based on the distance (D) to the obstacle and the relative speed (VK) with respect to the obstacle at a time when the side obstacle detection sensor 19c becomes unable to detect the obstacle may be used as the hold time. Thereby, the hold time becomes shorter, thus enabling earlier warning. Of course, the hold time is not limited to being determined by performing calculation using Equation (1), and the preset time may be used as the hold time.

Only when the distance (D) to the obstacle at a time when the side obstacle detection sensor 19c becomes unable to detect the obstacle is equal to or less than a side warning threshold greater than the second risk (the distance value), at step S2 a decision may be made to coordinate thereby to correct the first risk. Here, the "side warning threshold" is set to 7 m, for example. Thereby, the obstacle which is present so far away as to need no warning and is no longer detectable with the side obstacle detection sensor 19c can fall outside a target of coordination.

Further, only when the rear obstacle detection sensors 13e to 13h do not detect the obstacle when the side obstacle detection sensor 19c becomes unable to detect the obstacle, at step S2 a decision may be made to coordinate thereby to correct the first risk. The reason is that, if the rear obstacle detection sensors 13e to 13h detect the obstacle when the side obstacle detection sensor 19c becomes unable to detect the obstacle, proper warning control can be performed based on the results detected by the rear obstacle detection sensors 13e to 13h, even without correcting the first risk.

According to the embodiment of the present invention, as described above, the first risk (or the first warning threshold) is increased until the hold time elapses after all the side obstacle detection sensors 19a to 19d become unable to detect the obstacle, and thereby, early warning can be provided based on the results detected by the rear obstacle detection sensors 13e to 13h. Thus, a delay in the timing of warning or unwarned conditions can be suppressed.

The hold time is determined based on the distance (D) to the obstacle and the relative speed (VK) to the obstacle at a time when all the side obstacle detection sensors 19a to 19d become unable to detect the obstacle. Thereby, the rear obstacle detection sensors 13e to 13h detect, with improved accuracy, the obstacle which is no longer detectable with the side obstacle detection sensors 19a to 19d, and thus, a delay in warning or unwarned conditions can be suppressed.

Only when the distance (D) to the obstacle at the time when all the side obstacle detection sensors 19a to 19d become unable to detect the obstacle is equal to or less than the side warning threshold, the first risk is increased thereby to exclude the obstacle which is present so far away as to need no early warning and is no longer detectable, thus enabling suppression of unnecessary warning control.

Only when the rear obstacle detection sensors 13e to 13h do not detect the obstacle when all the side obstacle detection sensors 19a to 19d become unable to detect the obstacle, the first risk may be increased. If the rear obstacle detection sensors 13e to 13h do not detect the obstacle when the side obstacle detection sensors 19a to 19d becomes unable to detect the obstacle, obstacle detection information cannot be handed over from the side obstacle detection sensors 19a to 19d to the rear obstacle detection sensors 13e to 13h. In such a case, therefore, the first risk is increased until the hold time elapses, and thereby, a delay in warning or unwarned conditions can be suppressed.

The shorter one of the preset time and the time determined based on the distance to the obstacle and the relative speed to the obstacle at the time when all the side obstacle detection sensors 19a to 19d become unable to detect the obstacle may be used as the hold time. Thereby, the hold time becomes shorter, thus enabling earlier warning.

The first risk may be set larger as the relative speed to the obstacle at the time when all the side obstacle detection sensors 19a to 19d become unable to detect the obstacle becomes higher. Thereby, the higher relative speed can yield the earlier timing of warning, thus enabling suppression of a delay in warning or unwarned conditions.

The first risk may be corrected for each of the rear obstacle detection sensors 13e to 13h, according to the state of detection that the rear obstacle detection sensors 13e to 13h obtain when all the side obstacle detection sensors 19a to 19d become unable to detect the obstacle. If at least one of the rear obstacle detection sensors 13e to 13h detects the obstacle when all the side obstacle detection sensors 19a to 19d become unable to detect the obstacle, the first risk calculation unit 48 increases the first risk for the other rear obstacle detection sensors, exclusive of the rear obstacle detection sensor detecting the obstacle. Early warning control can be performed by using the rest of the rear obstacle detection sensors 13e to 13h, exclusive of the detecting one of the rear obstacle detection sensors 13e to 13h detecting the obstacle when all the side obstacle detection sensors 19a to 19d become unable to detect the obstacle. Also, erroneous advance of the timing of warning is suppressed.

Alternatively, as illustrated in FIG. 9, if the adjacent vehicle 60a enters the rear detection area MR1 of the rear obstacle detection sensor 13e arranged on the leftmost side among the rear obstacle detection sensors 13e to 13h and is detected at a predetermined distance (of 40 cm, for example) or shorter, results detected by the rear obstacle detection sensor 13e arranged on the leftmost side may be ignored. Alternatively, results detected by the rear obstacle detection sensor 13e arranged on the leftmost side and the rear obstacle detection sensor 13f arranged at the second position from the left may be ignored. Thereby, even if some of the plural rear obstacle detection sensors 13e to 13h detect the adjacent vehicle 60a, erroneous advance of the timing of warning is suppressed. In a method for ignoring, the first risk may be set to 0 for at least one of the rear obstacle detection sensors 13e to 13h which detects the obstacle at the predetermined distance (for example, 40 cm) or shorter when all the side obstacle detection sensors 19a to 19d become unable to detect the obstacle. This avoids warning based on results detected by the detecting one of the rear obstacle detection sensors 13e to 13h detecting the obstacle at the predetermined distance (for example, 40 cm) or shorter.

While the contents of the present invention have been described above with reference to the embodiment and examples, it is to be understood that the present invention is not limited to these descriptions, and it would be obvious to one of ordinary skill in the art that various modifications and improvements could be made thereto.

According to the travel control device and travel control method according to the embodiment, early warning can be provided about an obstacle detected by the rear obstacle detection sensors 13*e* to 13*h*. Thus, a delay in the timing of warning or unwarned conditions can be suppressed. Therefore, the present invention has industrial applicability.

The invention claimed is:

1. A travel control device comprising:
    a rear obstacle detection unit which detects an obstacle entering an area rearward of a vehicle, and a distance to the obstacle;
    a side obstacle detection unit which detects an obstacle entering a predetermined lateral side detection region including an area laterally rearward of the vehicle, and a distance to the obstacle;
    a rearward movement preparation detection unit which detects the vehicle preparing to move rearward;
    a warning unit which provides warning about the obstacle detected by the rear obstacle detection unit or the side obstacle detection unit; and
    a control unit which controls the warning unit so that the warning is provided, if the distance to the obstacle detected by the rear obstacle detection unit is equal to or less than a first warning threshold, or if a parameter based on the distance to the obstacle detected by the side obstacle detection unit is equal to or less than a second warning threshold,
    wherein, if the rearward movement preparation detection unit detects the vehicle preparing to move rearward and the parameter based on the distance to the obstacle detected by the side obstacle detection unit is greater than the second warning threshold, the control unit increases the first warning threshold until a hold time elapses after the side obstacle detection unit becomes unable to detect the obstacle.

2. The travel control device according to claim 1, further comprising a relative speed estimation unit which estimates a relative speed to the obstacle on the basis of the distance to the obstacle detected by the rear obstacle detection unit or the side obstacle detection unit, wherein
    the hold time is determined based on the distance to the obstacle and the relative speed to the obstacle at a time when the side obstacle detection unit becomes unable to detect the obstacle.

3. The travel control device according to claim 1, wherein if the rearward movement preparation detection unit detects the vehicle preparing to move rearward, and the parameter based on the distance to the obstacle detected by the side obstacle detection unit is greater than the second warning threshold and is equal to or less than a side warning threshold greater than the second warning threshold, the control unit increases the first warning threshold until a hold time elapses after the side obstacle detection unit becomes unable to detect the obstacle.

4. The travel control device according to claim 3, wherein the control unit increases the first warning threshold, only if the rear obstacle detection unit does not detect the obstacle when the side obstacle detection unit becomes unable to detect the obstacle.

5. The travel control device according to claim 2, wherein the hold time is a shorter one of a preset time and the time determined based on the distance to the obstacle and the relative speed to the obstacle at the time when the side obstacle detection unit becomes unable to detect the obstacle.

6. The travel control device according to claim 4, comprising a plurality of the rear obstacle detection units, wherein,
    if any of the rear obstacle detection units detects the obstacle when the side obstacle detection unit becomes unable to detect the obstacle, the control unit increases the first warning threshold for the other rear obstacle detection units, exclusive of the rear obstacle detection unit detecting the obstacle.

7. The travel control device according to claim 1, further comprising a relative speed estimation unit which estimates a relative speed to the obstacle on the basis of the distance to the obstacle detected by the rear obstacle detection unit or the side obstacle detection unit, wherein the control unit sets the first warning threshold larger as the relative speed to the obstacle at a time when the side obstacle detection unit becomes unable to detect the obstacle becomes higher.

8. A travel control method using a travel control device including:
    a rear obstacle detection unit which detects an obstacle entering an area rearward of a vehicle, and a distance to the obstacle; a side obstacle detection unit which detects an obstacle entering a predetermined lateral side detection region including an area laterally rearward of the vehicle, and a distance to the obstacle; a rearward movement preparation detection unit which detects the vehicle preparing to move rearward; and a warning unit which provides warning about the obstacle detected by the rear obstacle detection unit or the side obstacle detection unit, the method comprising:
        controlling the warning unit so that the warning is provided, if the distance to the obstacle detected by the rear obstacle detection unit is equal to or less than a first warning threshold, or if a parameter based on the distance to the obstacle detected by the side obstacle detection unit is equal to or less than a second warning threshold; and
        increasing the first warning threshold until a hold time elapses after the side obstacle detection unit becomes unable to detect the obstacle, if the rearward movement preparation detection unit detects the vehicle preparing to move rearward and the parameter based on the distance to the obstacle detected by the side obstacle detection unit is greater than the second warning threshold.

* * * * *